United States Patent
Romo

(10) Patent No.: US 8,371,175 B2
(45) Date of Patent: Feb. 12, 2013

(54) PRESSURE TRANSMITTER WITH PRESSURE SENSOR MOUNT

(75) Inventor: Mark G. Romo, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 700 days.

(21) Appl. No.: 12/571,611

(22) Filed: Oct. 1, 2009

(65) Prior Publication Data

US 2011/0079086 A1    Apr. 7, 2011

(51) Int. Cl.
*G01L 7/00* (2006.01)
(52) U.S. Cl. ............................................. 73/756; 73/753
(58) Field of Classification Search .................... 73/753, 73/756
See application file for complete search history.

(56) References Cited

U.S. PATENT DOCUMENTS

| | | | |
|---|---|---|---|
| 3,793,885 A | 2/1974 | Frick | 73/398 |
| 3,800,413 A | 4/1974 | Frick | 29/592 |
| 4,072,058 A | 2/1978 | Whitehead, Jr. | 73/720 |
| 4,120,206 A | 10/1978 | Rud, Jr. | 73/718 |
| 4,161,887 A * | 7/1979 | Stone et al. | 73/720 |
| 4,163,395 A | 8/1979 | Medlar et al. | 73/708 |
| 4,168,630 A | 9/1979 | Shirouzu et al. | 73/727 |
| 4,218,925 A | 8/1980 | DiDomizio, Jr. | 73/706 |
| 4,285,244 A | 8/1981 | Green | 73/720 |
| 4,370,890 A | 2/1983 | Frick | 73/718 |
| 4,427,842 A | 1/1984 | Anderson | 174/77 |
| 4,572,000 A | 2/1986 | Kooiman | 73/718 |
| 4,586,108 A | 4/1986 | Frick | 361/283 |
| 4,603,371 A | 7/1986 | Frick | 361/283 |
| 4,612,227 A | 9/1986 | Lam et al. | 728/137 |
| 4,612,812 A | 9/1986 | Broden | 73/718 |
| 4,670,730 A | 6/1987 | Takeda et al. | 338/4 |
| 4,675,643 A | 6/1987 | Tanner et al. | 338/4 |
| 4,730,496 A | 3/1988 | Knecht et al. | 73/724 |
| 4,745,810 A | 5/1988 | Pierce et al. | 73/706 |
| 4,773,269 A | 9/1988 | Knecht et al. | 73/706 |
| 4,790,192 A | 12/1988 | Knecht et al. | 73/721 |
| 4,833,920 A * | 5/1989 | Knecht et al. | 73/717 |
| 4,841,776 A | 6/1989 | Kawachi et al. | 73/706 |

(Continued)

FOREIGN PATENT DOCUMENTS

| EP | 317664 | 11/1987 |
|---|---|---|
| EP | 751385 | 5/1996 |

(Continued)

OTHER PUBLICATIONS

Search Report and Written Opinion for PCT/US2010/050815, dated Nov. 11, 2010.

(Continued)

*Primary Examiner* — Max Noori
(74) *Attorney, Agent, or Firm* — Westman, Champlin & Kelly, P.A.

(57) ABSTRACT

A pressure transmitter with pressure sensor mount includes pressure measurement circuitry. A metal body of the pressure transmitter has a pressure coupling configured to couple to a process pressure. A pressure sensor is configured to provide an output related to an applied pressure to the pressure measurement circuitry. A conduit is coupled to the pressure sensor and configured to apply an applied pressure corresponding to the process pressure to pressure sensor. A non-conductive spacer is configured to electrically isolate the conduit from the metal body. The non-conductive spacer has an opening formed therein and is arranged to convey the applied from the metal body to the conduit.

23 Claims, 5 Drawing Sheets

U.S. PATENT DOCUMENTS

| | | | | |
|---|---|---|---|---|
| 4,944,187 | A | 7/1990 | Frick et al. | 73/718 |
| 4,970,898 | A | 11/1990 | Walish et al. | 73/706 |
| 4,994,781 | A | 2/1991 | Sahagen | 338/47 |
| 5,212,989 | A | 5/1993 | Kodama et al. | 73/706 |
| 5,327,785 | A | 7/1994 | Maurer | 73/756 |
| 5,483,834 | A | 1/1996 | Frick | 73/724 |
| 5,520,054 | A | 5/1996 | Romo | 73/715 |
| 5,546,804 | A | 8/1996 | Johnson et al. | 73/431 |
| 5,670,722 | A | 9/1997 | Moser et al. | 73/756 |
| 5,684,253 | A | 11/1997 | Bonne et al. | 73/708 |
| 5,731,522 | A | 3/1998 | Sittler | 29/25.41 |
| 6,003,219 | A | 12/1999 | Frick et al. | 73/720 |
| 6,041,659 | A | 3/2000 | Wilda et al. | 73/720 |
| 6,050,145 | A | 4/2000 | Olson et al. | 73/706 |
| 6,295,875 | B1 | 10/2001 | Frick et al. | 73/718 |
| 6,487,912 | B1 | 12/2002 | Behm et al. | 73/753 |
| 6,511,337 | B1 | 1/2003 | Fandrey et al. | 439/320 |
| 6,581,469 | B2 | 6/2003 | Burczyk et al. | 73/716 |
| 6,658,940 | B2 | 12/2003 | Burczyk et al. | 73/715 |
| 6,662,662 | B1 | 12/2003 | Nord et al. | 73/715 |
| 6,681,636 | B2 * | 1/2004 | Ewers et al. | 73/707 |
| 6,782,754 | B1 | 8/2004 | Broden et al. | 73/753 |
| 6,883,380 | B2 | 4/2005 | Romo | 73/729.2 |
| 6,901,803 | B2 | 6/2005 | Fandrey | 73/706 |
| 6,907,789 | B2 | 6/2005 | Bodin | 73/753 |
| 6,920,795 | B2 | 7/2005 | Bischoff et al. | 73/706 |
| 7,057,247 | B2 | 6/2006 | Kurtz et al. | 257/419 |
| 7,080,558 | B2 | 7/2006 | Broden et al. | 73/706 |
| 7,190,053 | B2 | 3/2007 | Orth et al. | 257/659 |
| 7,287,432 | B2 | 10/2007 | Schnaare et al. | 73/706 |
| 2002/0100333 | A1 | 8/2002 | Gravel et al. | 73/756 |
| 2002/0108447 | A1 | 8/2002 | Burczyk et al. | 73/716 |
| 2004/0226383 | A1 | 11/2004 | Romo | 73/729.2 |
| 2005/0072243 | A1 | 4/2005 | Broden et al. | 73/715 |
| 2005/0248434 | A1 | 11/2005 | Kurtz et al. | 338/42 |
| 2008/0229838 | A1 * | 9/2008 | Kleven et al. | 73/720 |

FOREIGN PATENT DOCUMENTS

| | | |
|---|---|---|
| WO | WO 97/21986 | 6/1997 |
| WO | WO 2006/023987 | 3/2006 |

OTHER PUBLICATIONS

Communication pursuant to Rule 161(1) and 162 EPC, dated May 8, 2012, 2 pages.

Notification of Transmittal of the International Search Report and the Written Opinion for PCT/US2008/002849, dated Sep. 22, 2008.

International Search Report for International Application No. PCT/US2004/015139, filed May 13, 2004; mailed Nov. 15, 2004.

S. Hein et al., "Capacitive Differential Pressure Sensor with High Overload Capability Using Silicon/Glass Technology," Transducers '97, 1997 International Conference on Solid-State Sensors and Actuators, p. 1477-1480.

Search Report and Written Opinion for application No. PCT/US2008/075194, mailed Nov. 26, 2008.

* cited by examiner

PRESSURE TRANSMITTER WITH PRESSURE SENSOR MOUNT

BACKGROUND OF THE INVENTION

The present invention relates to pressure transmitters for use in industrial process control and monitoring applications. More specifically, the present invention relates to a pressure sensor mount which provides electrical isolation in a pressure transmitter.

Pressure transmitters, and other pressure sensing instruments, include a pressure sensor that senses the pressure of a process fluid. The pressure sensor provides an electrical output to an electrical circuit that generates a pressure transmitter (or pressure instrument) output.

Some types of pressure sensors require electrical isolation from a body of the transmitter. Depending upon the technology employed to implement the pressure sensor, in some instances it can be difficult to mount the pressure sensor within the transmitter body while also providing electrical isolation from the transmitter body.

SUMMARY

A pressure transmitter with pressure sensor mount, includes pressure measurement circuitry. A metal body of the pressure transmitter has a pressure coupling configured to couple to a process pressure. A pressure sensor is configured to provide an output related to the process pressure to the pressure measurement circuitry. A conduit is coupled to the pressure sensor and configured to apply an applied pressure corresponding to the process pressure to pressure sensor. A non-conductive spacer is disposed between the metal bids and conduit and is configured to electrically isolate the conduit from the metal body. The non-conductive spacer has an opening formed therein and is arranged to convey the applied pressure from the metal body to the conduit.

DETAILED DESCRIPTION

The present invention provides a mount for a pressure sensor in a pressure transmitter which can be used to electrically isolate the pressure sensor from a body of the pressure transmitter.

Figure 1:
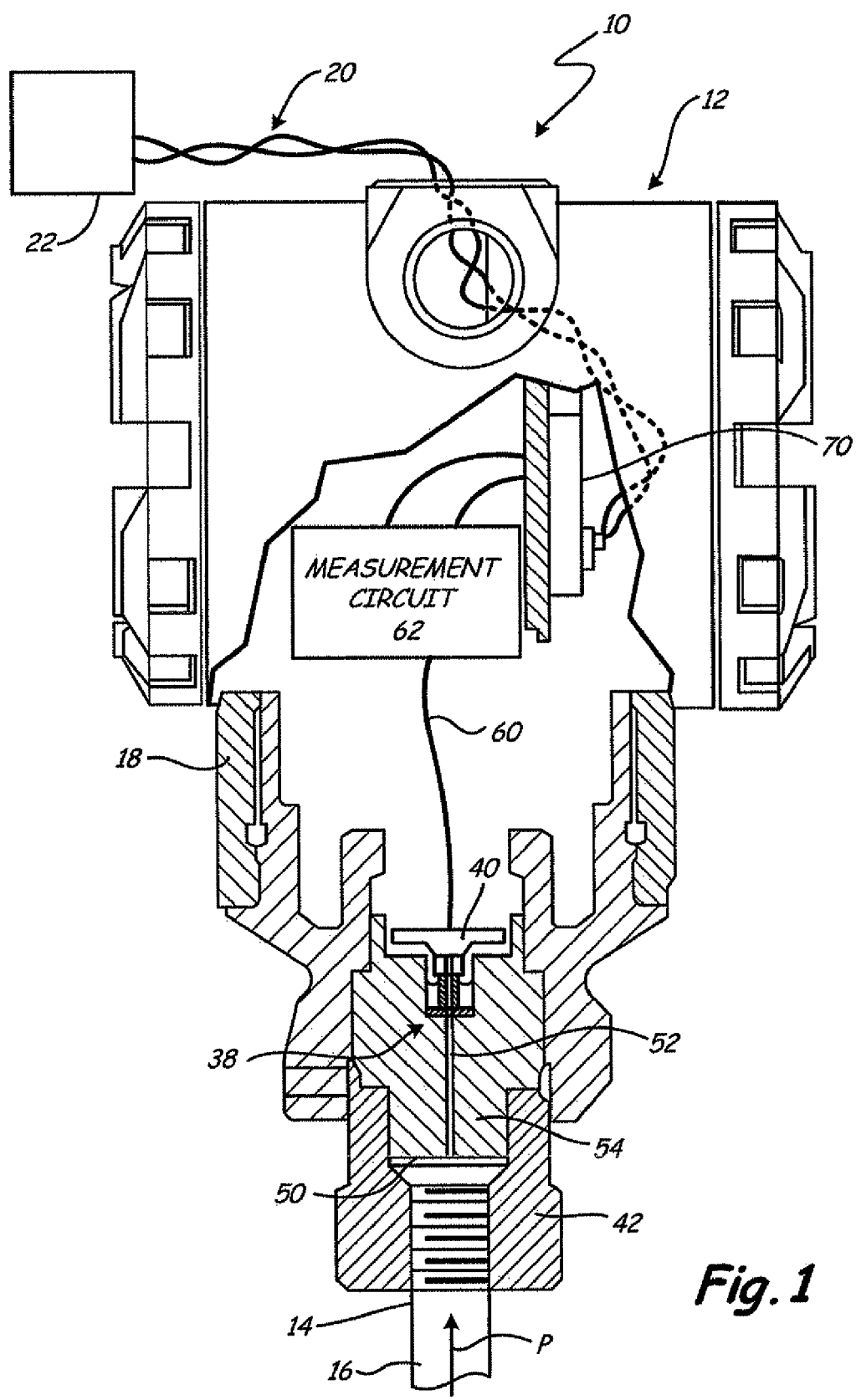
FIG. 1 is a partial cutaway view of a pressure transmitter in a process control or monitoring system.

FIG. 1 is a diagram showing a process control or measurement system 10 which includes a pressure transmitter 12 coupled to process piping 14 which carries a process fluid 16. (Transmitter 12 is a measurement component of system 10.) The process fluid 16 applies a pressure P to the pressure transmitter 12. Pressure transmitter 12 provides an output, for example on a two-wire process control loop 20 to a remote location such as a control room 22. The process control loop 20 can operate in accordance with any appropriate protocol.

In one configuration, process control loop 20 comprises a two-wire process control loop in which an analog current level is used to represent a "process variable" related to the process pressure P. In another example implementation, the process control loop 20 carries a digital value which is related to the process pressure P. Examples of such protocols include the HART® or Foundation FieldBus communication protocol. Another example process control loop comprises a wireless communication link. In such a configuration, element 20 represents a wireless communication link between transmitter 12 and process control room 22.

Transmitter 12 includes a pressure sensor (pressure sensor die) 40 which can operate in accordance with any appropriate technique. Example techniques include micro machine configurations, for example, which have an element with an electrical property which changes in response to applied pressure. A process coupling 42 couples a body or housing 18 of transmitter 12 to process piping 14. This allows the process pressure P to be applied to an isolation diaphragm 50 of transmitter 12. The pressure P causes a deflection in the diaphragm 50 which is transmitted through a capillary tube 52 which carries an isolation fluid to the pressure sensor 40. The capillary tube 52 extends through a pressure sensor module 54 which also supports pressure sensor 40. Sensor module 54 includes a sensor mount 38 which is configured to mount pressure sensor 40. Pressure sensor 40 provides an electrical output 60 to measurement circuitry 62. Measurement circuitry 62 connects to a terminal block 70 which couples to the process control loop 20. In one example configuration, process control loop 20 is also used to provide power to circuitry, such as measurement circuitry 62, of transmitter 12.

Figure 2:
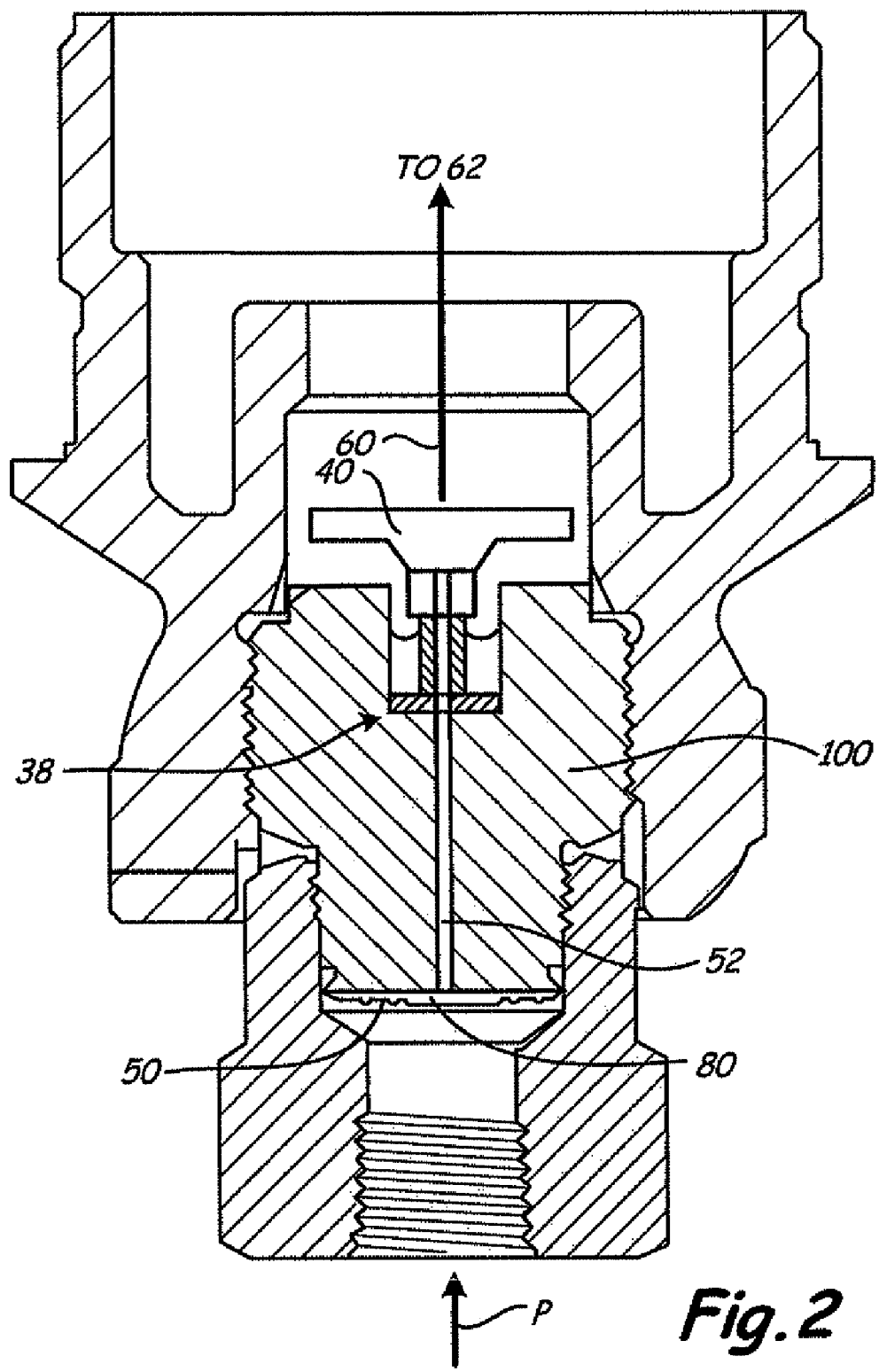
FIG. 2 is an enlarged cross sectional view of the pressure transmitter of FIG. 1 showing a pressure sensor mount in accordance with the present invention.

FIG. 2 is an enlarged cross sectional view of a portion of transmitter 12 showing sensor mount 38 in greater detail. In FIG. 2, the isolation diaphragm 50 is visible in greater detail and defines a cavity 80 between the diaphragm 50 and sensor module 54 which couples to capillary tube or conduit 52 in header 100. As pressure P is applied from the process fluid, the isolation diaphragm 50 exerts a pressure against an fill fluid contained in cavity 80 and capillary tube 52 such that the pressure P is transferred to pressure sensor 40. Note that in FIGS. 1 and 2, the sensor mount 38 and pressure sensor 40 are not shown to scale and are enlarged for illustration purposes.

Typical techniques used to mount a pressure sensor die that require electrical isolation from the transmitter body rely on expensive components and processes. These processes are often difficult to implement and may lead to reliability problems. The present invention offers a technique for mounting a pressure sensor die in a pressure transmitter while providing electrical isolation between the die and the transmitter body.

Examples of processes and components that have been used to mount pressure sensor dies include metal plating, metal to ceramic joints, adhesives, and others. However, these techniques may experience significant reliability issues. For example, metal plating is often used to allow components to be soldered together. However, poor quality plating may result in poor wetting or poor adhesion of the plating to the component. This results in failures during the manufacturing process as well as reduced reliability in the finished product. Similarly, metal to ceramic joints may have quality problems. For example, metal brazing to ceramic may suffer from adhesion failure. Thin films on ceramic may also have quality issues associated with surface finish, surface damage from machine and grinding processes as well as contaminants which are not easily removed from the ceramic due to the porosity of the material.

In contrast, the present invention uses more established processes and materials that offer improved reliability and quality. For example, in various embodiments, the present invention uses a compression glass-to-metal seal and soldering or welding of components.

Figure 3:
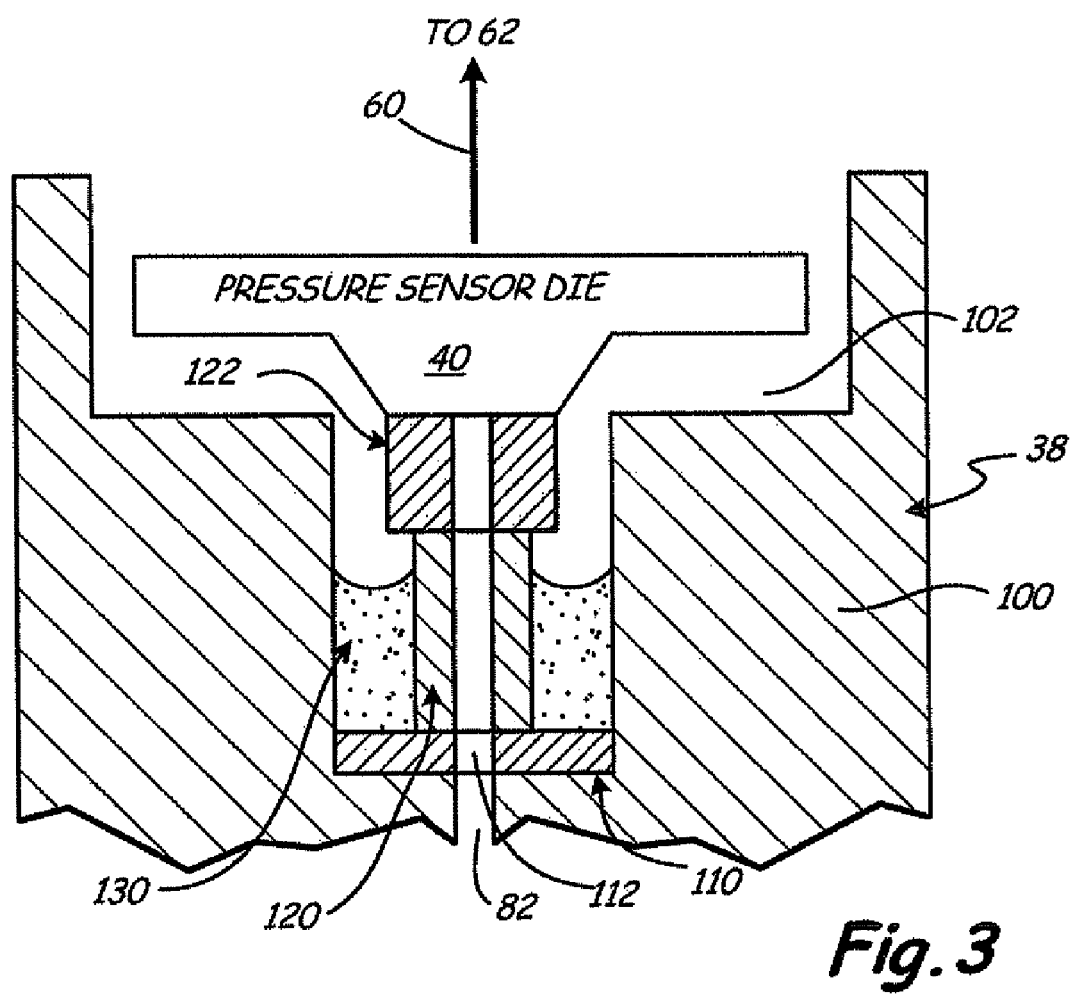
FIG. 3 is a cross sectional view showing the pressure sensor mount of FIG. 2 in greater detail.

According to one embodiment, FIG. 3 is an enlarged cross sectional view of sensor mount 38 for mounting pressure sensor die 40. Mount 38 includes a header body 100 which is typically stainless steel or the like. A cavity 102 is formed in the header body 100 which carries the sensor die 40. A via or capillary tube 82 extends through the header 100 as illustrated in FIG. 2. A dielectric spacer 110 is positioned at the bottom of the cavity 102 and has an opening 112 formed therein which is aligned with via 82. A metal tube 120 having an opening formed therethrough is aligned with the opening in dielectric spacer 112 and couples capillary tube 82 to a die (pressure sensor) mount tube 122. Tube 120 is secured in cavity 102 by hermetic seal glassing 130. In this configuration, the dielectric spacer 110 functions only as a spacer. Thus, nothing needs to be attached to spacer 110 which eliminates some of the difficulties of prior art designs. This allows the material to be a ceramic material without compromising the seal. The glass seal formed by glassing 130 above the dielectric spacer 110 provides a seal between the body 100 and the tube 120. This configuration replicates the multiple glass-to-metal seals used for electrical pin feed-throughs in prior art configurations. This tube seal is preferably formed simultaneously with an electrical pin glass-to-metal seal with metal tube 120 and electrical connection pins (not shown). These components may be fabricated from alloy 52 to have an appropriate thermal expansion coefficient which is slightly less than the thermal coefficient of glassing 130. The glass-to-metal seals are all under heavy compression stress from these stainless steel header body yielding very high reliability seals. The tube 120 extends above the glass 130.

In one embodiment, a die mount tube 122 is sealed to tube 120 and is preferably selected to have a thermal expansion which is substantially matched to that of the sensor die 40. Tube 122 includes an opening formed therethrough which is aligned with the opening of metal tube 120 and can be soldered, braised, or welded or otherwise attached as appropriate, to the tube 120. Note that soldering or braised techniques may have complications in their implementation as they may block the sensor hole through the tubes. Welding can reduce this problem and, in one specific configuration, resistance projection welds may be preferred.

The sensor die 40 is preferably mounted to the tube 122 having a matched thermal expansion coefficient. The mounting may be through any appropriate technique such as a soldered joint or the like. Examples include techniques used to solder silicon die to Kovar tubes or bushings. Electroless and/or electrolytic metal plated layers are not required. Metal films formed through sputtering can be used to provide a solder wedding surface as required. This configuration results in a robust mount for the pressure sensor die 40 using well established materials and processing techniques as well as providing electrical isolation between the pressure sensor die 40 and the body 100.

Figure 4:
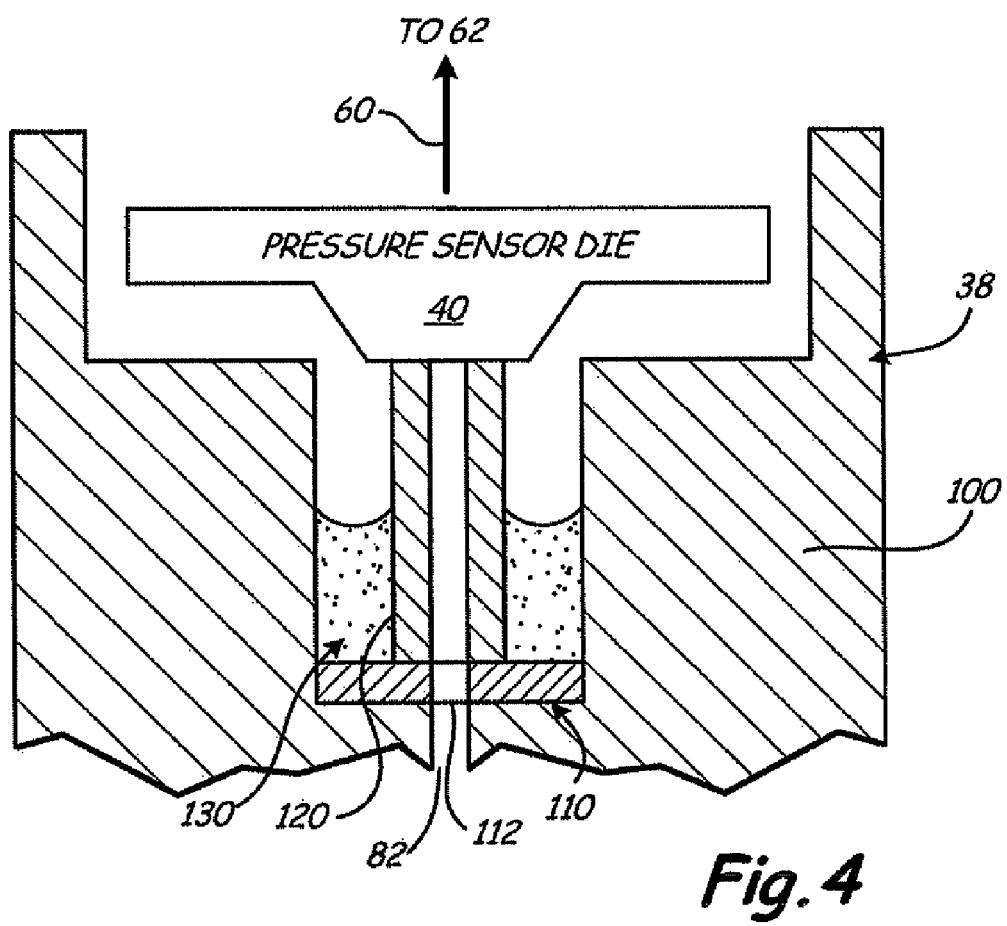
FIG. 4 is a cross sectional view of another example embodiment of a pressure sensor mount.

FIG. 4 is a cross sectional view of another embodiment in which the pressure sensor mount tube 122 of FIG. 3 is not used. In such a configuration, tube 120 is attached directly pressure sensor die 40. Such a configuration may be implemented if tube 120 is compatible with the material used in pressure sensor die 120. For example, if a solder joint may be employed, the pressure sensor die 40 can be soldered mounted directly to the end of the tube 120. However, this typically may not be possible because the glassing material 130 may require the material of tube 120 to have a thermal expansion coefficient which is greater than that which may be directly mounted to a pressure sensor die made of silicon.

Figure 5:
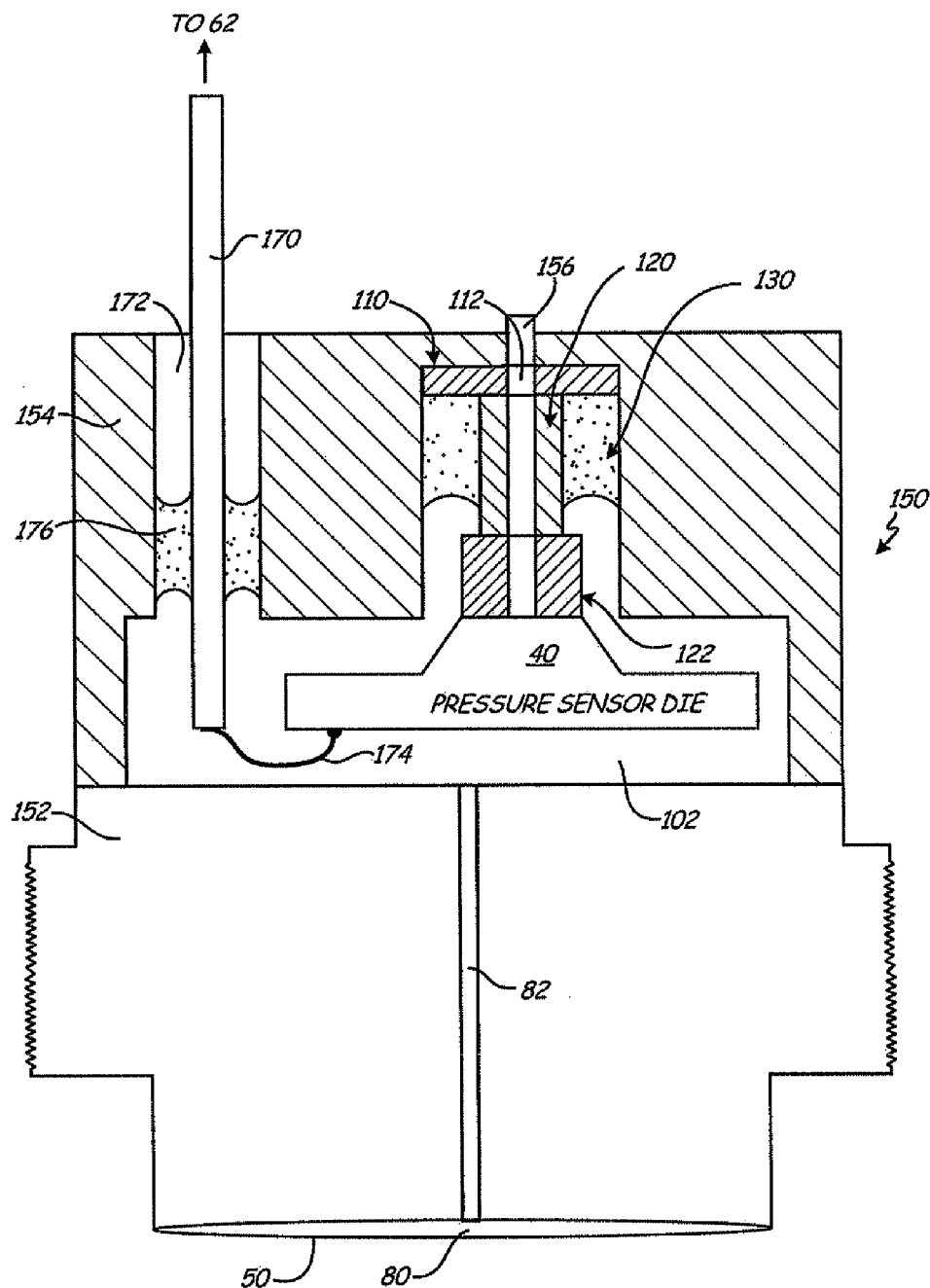
FIG. 5 is a cross sectional view of another example embodiment of a pressure sensor mount.

FIG. 5 shows another example embodiment of a pressure sensor mount 150. In the embodiment of FIG. 5, the pressure from the process fluid is applied to a cavity 102 which surrounds the pressure sensor die 40. In this configuration, cavity 102 receives the process pressure through capillary tube 82, which is transmitted across isolation diaphragm 50 using a fill fluid, such as oil or the like. Elements in FIG. 5 which are similar to those discussed earlier have retained their numbering. Pressure sensor mount 150 includes a process coupling 152 coupled to a header body 154. In this configuration, opening 112 couples to a tube 156 which is coupled to a reference pressure which may, for example, comprise an ambient pressure. In the embodiment of FIG. 5, a metal connection pin 170 is also shown. Connection pin 170 extends through a via 172 in the header body 154 and into the cavity 102. A wire 174 is used to provide an electrical connection between pin 170 and the pressure sensor die 40. This coupling can be completed through, for example, wire bonding techniques. A hermetic glass seal 176 is used to seal the metal pin 170 in via 172 and thereby seal cavity 102.

Although the present invention has been described with reference to preferred embodiments, workers skilled in the art will recognize that changes may be made in form and detail without departing from the spirit and scope of the invention. Although a pressure sensor is illustrated as a pressure sensor die in the above discussion, other configurations may also be implemented. Further, although the capillary tube and isolation diaphragms are shown, other configurations can be employed including directly coupling to the process fluid. The various conduits and tubes shown above are illustrated as being circular and concentric. However, the invention is not limited to these configurations. The metal tube and die mount tube provide one example configuration conduit used to couple the pressure sensor provided by the pressure sensor die to the process pressure. In some configurations, the dielectric spacer may be of any non-conductive material having a relatively high electrical resistance and the material is not limited to a dielectric material. Note that the material used to adhere the metal tube to the header body should be of a non-conductive material to prevent an electrical connection to be formed therebetween. The glass mounts described herein can be used to form a compression joint with the metal body. The pressure sensor can comprise any appropriate sensor and, in one configuration, comprises a MEMS (microelectro-mechanical system) pressure sensor.

What is claimed is:

1. A pressure transmitter with pressure sensor mount, comprising:
    pressure measurement circuitry;
    a metal body of the pressure transmitter having a pressure coupling configured to couple to a process pressure;
    a pressure sensor configured to receive the process pressure and responsively provide a sensor output related to the process pressure to the pressure measurement circuitry the sensor output electrically coupled to the measurement circuitry;
    a conduit coupled to the pressure sensor configured to apply an applied pressure corresponding to the process pressure to pressure sensor; and
    a non-conductive spacer disposed between the metal body and conduit and configured to electrically isolate the conduit from the metal body of the pressure transmitter, the non-conductive spacer having an opening formed therein and arranged to convey the applied pressure from the metal body to the conduit.

2. The pressure transmitter of claim 1 wherein the non-conductive spacer comprises a dielectric spacer.

3. The pressure transmitter of claim 1 wherein the conduit comprises a tube.

4. The pressure transmitter of claim 1 wherein the conduit comprises metal.

5. The pressure transmitter of claim 1 wherein the conduit is coupled to the metal body of the pressure transmitter by a compression joint.

6. The pressure transmitter of claim 5 wherein the compression joint comprises glass.

7. The pressure transmitter of claim 1 wherein the conduit abuts the non-conductive spacer to thereby secure the non-conductive spacer in position.

8. The pressure transmitter of claim 1 wherein the non-conductive spacer is configured to fit in a cavity of the metal body.

9. The pressure transmitter of claim 1 wherein the opening of the non-conductive spacer is aligned with an opening through the metal body to the pressure coupling whereby the applied pressure comprises the process pressure.

10. The pressure transmitter of claim 1 wherein the conduit is bonded to the pressure sensor.

11. The pressure transmitter of claim 1 including a pressure sensor mount conduit positioned between the conduit and the pressure sensor having an opening formed therethrough configured to apply the applied pressure from the conduit to the pressure sensor.

12. The pressure transmitter of claim 11 wherein the pressure mount conduit is bonded to the conduit and to the pressure sensor.

13. The pressure transmitter of claim 1 wherein the applied pressure comprises reference pressure.

14. The pressure transmitter of claim 1 wherein the pressure sensor is formed of silicon.

15. The pressure transmitter of claim 1 including an isolation diaphragm in the metal body arranged to isolate process fluid from the pressure sensor and arranged to convey the process pressure to the conduit.

16. A method of coupling a pressure sensor in a pressure transmitter to a process fluid pressure, comprising:
receiving the process fluid pressure;
conveying the process fluid pressure to an electrically isolated pressure sensor through a metal body of the pressure transmitted, a conduit and a non-conductive spacer, the metal body having a pressure coupling configured to couple to the process fluid; and
coupling the conduit to an opening in the non-conductive spacer.

17. The method of claim 16 wherein the non-conductive spacer comprises a dielectric spacer.

18. The method of claim 16 wherein the conduit is coupled to the metal body of the pressure transmitter with a compression joint.

19. The method of claim 18 wherein the compression joint comprises glass.

20. The method of claim 16 wherein the conduit abuts the non-conductive spacer to thereby secure the non-conductive spacer in position.

21. The method of claim 16 wherein the non-conductive spacer is configured to fit in a cavity of the metal body.

22. The method of claim 16 wherein the opening of the non-conductive spacer is aligned with the conduit through the metal body.

23. The method of claim 16 including bonding a tube to the pressure sensor.

* * * * *